Patented Feb. 17, 1953

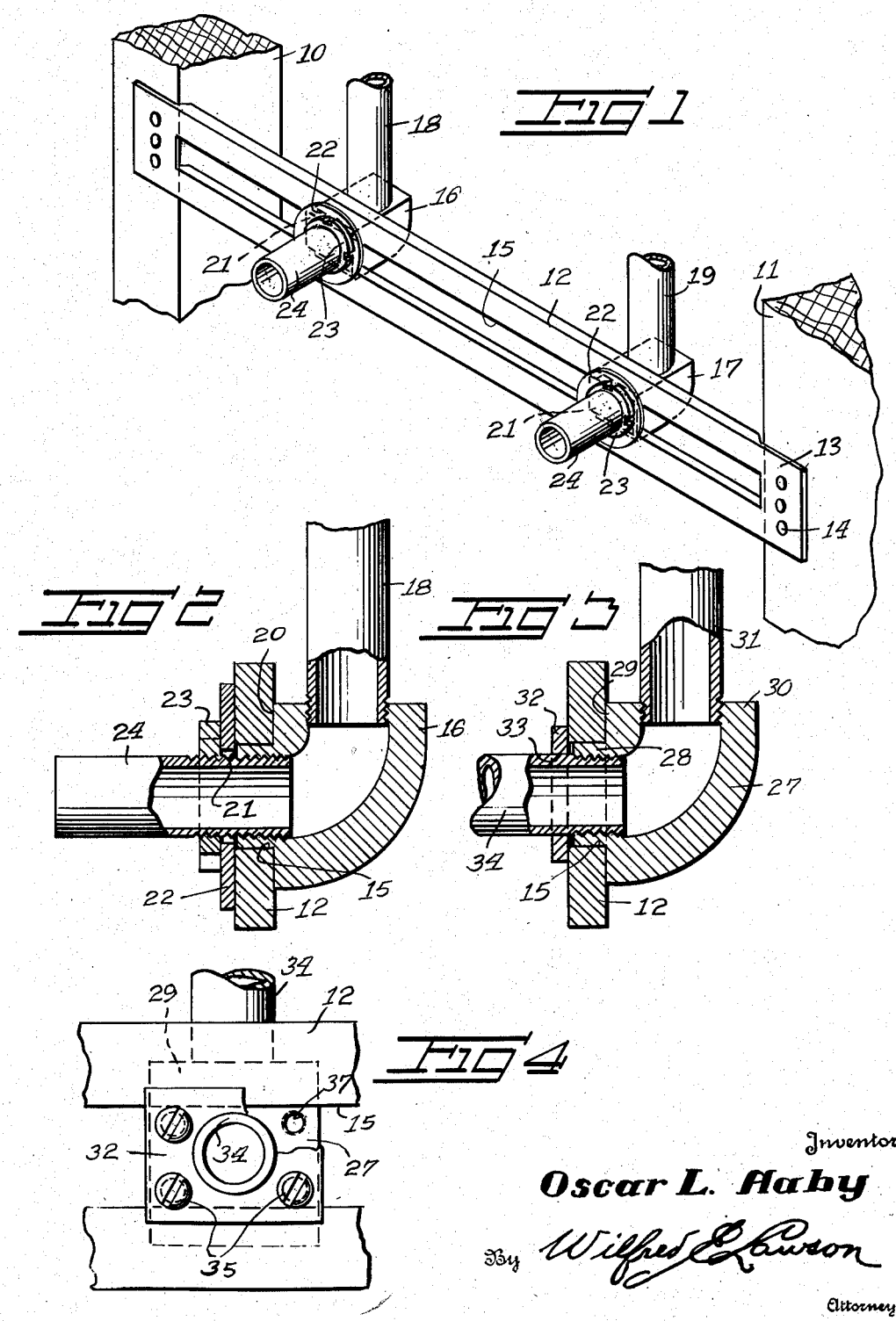

2,628,799

UNITED STATES PATENT OFFICE 2,628,799

SUPPORTING BRACKET FOR WATER PIPE FITTINGS

Oscar L. Aaby, Woodville, Wis.

Application February 15, 1949, Serial No. 76,495

1 Claim. (Cl. 248—57)

1

This invention relates to a water supply bracket suitable for lavatories and closets and is intended for being secured directly on the studding when installing lavatories and water closets in buildings. It is applicable either for iron or copper tubing and provides sliding adjustment for the tubing to fit all lavatory or closet supplies now on the market, without any further support for the pipes.

This bracket comprises a straight flat bar carrying an elbow shaped fitting for each tube or pipe, which fittings are lengthways slidable on said bracket. The same is extremely simple in construction, requiring no fitting and can be readily and cheaply supplied for the market.

The objects and advantages of the invention will be understood from the subjoined with the aid of the attached drawing wherein like numerals relate to the same details in the different views.

Figure 1 is a perspective assembled view with pipes and fittings erected in place between two studdings or posts in a lavatory;

Figure 2 is a section on a vertical plane through one of the fittings on said bracket in Figure 1;

Figure 3 is a similar view of a modified form of fittings; and

Figure 4 is a face view of Figure 3, as seen from the left of said figure.

Referring first to Figures 1 and 2, reference numerals 10 and 11 indicate the left and right studding respectively for a lavatory, and numeral 12 denotes the bracket of a length corresponding to the width between the posts or studdings 10 and 11 and having a uniform thickness for said length, but with a thinner securing ear 13 at each end with nail or screw holes 14 for securing the bracket on the studdings. A parallel edged slit or opening 15 is provided lengthways of said bracket between the two ears 13.

For hot and cold water supply this longitudinal opening is intended to accommodate a pair of adapters or elbow shaped fittings 16 and 17, one for carrying a cold water pipe 18 and the other for a hot water pipe 19, both pipes shown entering vertically into the respective elbow fitting. The horizontal branch of the elbow has threaded into it a short nipple 24 adapted for connecting the lower end of the supply pipe, to a faucet or closet tank supply. Each elbow fitting has a flat surface 20 abutting against the inner surface of the bracket 12 and a square projection 21 extending from said surface, adapted to fit in said longitudinal opening so as to hold the pipe and elbow upright in the bracket, while permitting sideways sliding for adjustment of relative position of the two supply pipes.

2

On the nipple 24 fitting loosely is a metal washer 22 of a diameter large enough to straddle the longitudinal opening 15 to contact with the solid, forward surface of the bracket 12. A clamping nut 23 fits the threads of the nipple 24. Thus by drawing up the nut tightly against the washer 22, the elbow 16 with the supply pipe 18 will be held firmly on the bracket 12 after being adjusted sideways in the opening 15.

The free end of the nipple 24 is adapted to connect directly or indirectly with a faucet for emptying cold water from supply pipe 18 into a lavatory basin. Similarly the hot water supply pipe 19 furnishes hot water through a faucet elbow 17 with nipple 24, secured on the bracket 12 and held in position by washer 22 and nut 23.

A slight modification is shown in Figures 3 and 4. This construction is used to accommodate a faucet having a threaded shank 34, which does not require an intermediary nipple for securing it on the elbow 27, but the stub 28 of the elbow 27 is threaded direct onto the shank 34. The forward projection 28 of the elbow is internally threaded for that purpose and has an outside cross section to fit closely between the edges of the longitudinal opening 15 of the bracket 12. In all other respects the elbow 28 is similar to the above described elbow 16, with a flat contacting surface 29 fitting against the rear surface of the bracket 12, and a vertical arm portion 30 into which a supply pipe 31, of either iron or copper tubing, is threaded for hot or cold water.

The only difference in construction resides in the means for securing the elbow in adjusted position on the bracket. In this case the securing means consists of a square or rectangular pressure plate 32 of metal, having a central circular opening 33 of a diameter which fits the faucet shank 34. This pressure plate is secured by a number of screws 35, four being shown, which engage in threaded holes 37 provided in the front projection 28 of the elbow 27 with corresponding plain holes being provided in the plate 32. In this manner the supply pipe 31 and the elbow 27 becomes rigidly fixed on the bracket 12 in any suitable adjusted position, similar to what is done with regard to the first described elbows 16 and 17.

These brackets with one or the other of the types of elbow fixtures take care of all supplies and faucets on the market.

As already stated, this bracket fixture can be used for copper and iron piping alike, but since copper tubing from supply pipe to faucet is now coming more and more in use, replacing iron piping, this bracket construction is most suitable as eliminating all other strapping and clamping for the piping.

Although this invention has been described mainly as useful for supplying water to lavatory and closet supply, it will be evident that the same may be applied to fluid conduits for other media and purpose such as oil, acid and even gas supplies.

It should be noted that, although the figures show the water supply as entering from the top through pipes 18 and 19, the condition may be reversed by merely turning the elbow shaped fittings upside down on the bracket 12, or else by turning the bracket with the fittings in the position indicated in Figure 1, upside down and then nail the bracket to the posts 10 and 11. The supply pipe connects to fittings or elbows 16 and 17 in that case at the bottom, and to the lavatory faucet or closet tank water supply at the top.

It is to be understood that the invention as herein disclosed may be varied from the details described and shown with departure from the spirit of the subjoined claim.

I claim:

In a supporting bracket for water pipe fittings, a flat elongated plate having a slot extending longitudinally thereof and adapted to span the space between adjacent studding, reduced extensions formed at the ends of the outer side of the plate abutting the outer faces of the studding, said extensions being apertured to receive fastenings, such as nails and the like, to secure the plate in place, an elbow having a squared end portion slidably engaged in said slot, a nipple projecting from the squared end of the elbow outwardly beyond the plate in threaded engagement therewith, and a washer and nut assembly on the threaded portion of the nipple, said washer being clamped against the outer face of the plate, when the nut is tightened to secure the elbow in adjusted position relatively to a water supply pipe.

OSCAR L. AABY.

REFERENCES CITED

The following references are of record in the file of this patent:

UNITED STATES PATENTS

| Number    | Name           | Date           |
|-----------|----------------|----------------|
| 1,213,865 | Gunn           | Jan. 30, 1917  |
| 1,791,420 | Mayo           | Feb. 3, 1931   |
| 1,868,037 | Weatherhead    | July 19, 1932  |
| 1,878,821 | Daugherty      | Sept. 20, 1932 |
| 2,029,089 | Weirauch       | Jan. 28, 1936  |
| 2,295,888 | Bucknell et al.| Sept. 15, 1942 |